(12) United States Patent
Lenoble et al.

(10) Patent No.: US 8,591,999 B2
(45) Date of Patent: Nov. 26, 2013

(54) COATING COMPOSITIONS

(75) Inventors: Bertrand Louis Julien Lenoble, Silly (BE); Yihan Liu, Midland, MI (US); Francisco Palencia, Midland, MI (US); Lori Jean Poungthana, Saginaw, MI (US); Jeffrey Rastello, Saginaw, MI (US)

(73) Assignee: Dow Corning Corporation, Midland, MI (US)

( * ) Notice: Subject to any disclaimer, the term of this patent is extended or adjusted under 35 U.S.C. 154(b) by 92 days.

(21) Appl. No.: 12/994,476

(22) PCT Filed: May 26, 2009

(86) PCT No.: PCT/EP2009/056347
§ 371 (c)(1), (2), (4) Date: Nov. 24, 2010

(87) PCT Pub. No.: WO2009/153134
PCT Pub. Date: Dec. 23, 2009

(65) Prior Publication Data
US 2011/0076409 A1 Mar. 31, 2011

Related U.S. Application Data

(60) Provisional application No. 61/056,481, filed on May 28, 2008.

(51) Int. Cl.
*B05D 3/02* (2006.01)

(52) U.S. Cl.
USPC .......................................... 427/387; 427/389

(58) Field of Classification Search
None
See application file for complete search history.

(56) References Cited

U.S. PATENT DOCUMENTS

| | | | |
|---|---|---|---|
| 4,940,743 A | 7/1990 | Grape et al. | |
| 5,955,536 A * | 9/1999 | Popa et al. | 524/837 |
| 7,531,241 B2 | 5/2009 | Inokuchi | |
| 8,012,593 B2 | 9/2011 | Deruelle et al. | |
| 2004/0219373 A1 * | 11/2004 | Deruelle et al. | 428/447 |
| 2007/0059538 A1 | 3/2007 | Inokuchi | |
| 2010/0239771 A1 * | 9/2010 | Liu et al. | 427/387 |

FOREIGN PATENT DOCUMENTS

| | | |
|---|---|---|
| DE | 102005031043 | 7/2005 |
| EP | 0924230 | 9/2004 |
| JP | 10-120903 | 5/1998 |
| WO | 9747569 | 12/1997 |
| WO | 2007003264 | 1/2007 |

\* cited by examiner

*Primary Examiner* — Erma Cameron
(74) *Attorney, Agent, or Firm* — Patricia M. Scaduto

(57) ABSTRACT

The invention relates to coatings for leather. In particular it relates to top coats for leather. It provides a leather coating composition comprising an organic synthetic resin in aqueous dispersion and an organopolysiloxane, characterized in that the organopolysiloxane is present in aqueous emulsion and comprises a silicone resin having an empirical formula: (I) where •R is a monovalent organic group having 1-30 carbon atoms, •Z is hydrogen or an alkyl group having 1-4 carbon atoms, •x has a value from 0.75 to 1.7, and •y has a value from 0.1 to 2.0, and having a viscosity of from 1 to 4000 mPa·s at 25° C. We have found that the use of a silicone resin according to the invention greatly increases the abrasion resistance, as measured by the Taber method, of leather coated with the coating composition.

$$R_xSi(OZ)_y(O)_{\frac{4-x-y}{2}} \qquad (I)$$

18 Claims, No Drawings

COATING COMPOSITIONS

CROSS REFERENCE TO RELATED APPLICATIONS

This application is a U.S. national stage filing under 35 U.S.C. §371 of PCT Application No. PCT/EP2009/056347 filed on 26 May 2009, currently pending, which claims the benefit of U.S. Provisional Patent Application No. 61/056,481 filed 28 May 2008 under 35 U.S.C. §119 (e). PCT Application No. PCT/EP2009/056347 and U.S. Provisional Patent Application No. 61/056,481 are hereby incorporated by reference.

This application relates to coatings for leather. In particular it relates to top coats for leather.

Leather is coated to improve the surface smoothness and flexibility of the leather and to improve resistance to water, solvents, weather and/or abrasion. Leather is being used increasingly in the automotive industry for car interiors, particularly car seats. This is a demanding application, particularly in respect of abrasion resistance.

Coatings for leather are based on a synthetic resin, for example a polyurethane and/or polyurea, applied from solvent or from aqueous dispersion. Application from aqueous dispersion is preferred, to avoid solvent emissions. EP-A-924230 describes a coating composition based on an aqueous dispersion of a polyurethane/urea containing alkoxysilane groups reacted onto the polyurethane/urea. Silicones have been added to leather coating compositions. JP-A-10-120903 describes a coating based on a polyorganosilsesquioxane resin and silicone rubber particles. Silicone gum dispersions have also been used in leather coatings.

According to the present invention an organopolysiloxane is used in a leather coating composition. The organopolysiloxane is present in aqueous emulsion and comprises a silicone resin having an empirical formula $$R_x\text{Si}(OZ)_y(O)_{\frac{4-x-y}{2}}$$

where
R is a monovalent organic group having 1-30 carbon atoms,
Z is hydrogen or an alkyl group having 1-4 carbon atoms,
x has a value from 0.75 to 1.7, and
y has a value from 0.1 to 2.0,
and having a viscosity of from 1 to 4000 mPa·s at 25° C.

A leather coating composition according to the invention comprises an organic synthetic resin in aqueous dispersion and an organopolysiloxane. The organopolysiloxane is present in aqueous emulsion and comprises a silicone resin having the empirical formula:

$$R_x\text{Si}(OZ)_y(O)_{\frac{4-x-y}{2}}$$

as defined above. The invention includes a process for coating leather in which such a coating composition is applied to the surface of the leather and is allowed to dry on the surface.

In a process according to the invention for the preparation of a leather coating composition, a silicone resin is added to an aqueous dispersion of an organic synthetic resin. The silicone emulsion comprises A) 1-70 weight percent of a silicone resin having an empirical formula:

$$R_x\text{Si}(OZ)_y(O)_{\frac{4-x-y}{2}}$$

as defined above;
B) 0-40 weight percent of a hydroxy terminated polydiorganosiloxane;
C) 0.5-20% based on the weight components A) and B) of an emulsifier, and
D) 0.001-5% based on the weight of the emulsion of a water soluble salt.

We have found that the use of a silicone resin according to the invention greatly increases the abrasion resistance, as measured by the Taber method, of leather coated with the coating composition.

The silicone resins in the emulsions of the present invention are organopolysiloxanes. Organopolysiloxanes are polymers containing siloxane units independently selected from $(R_3SiO_{0.5})$, $(R_2SiO)$, $(RSiO_{1.5})$, or $(SiO_2)$ siloxy units, commonly referred to as M, D, T, and Q siloxy units respectively, where R may be any organic group containing 1-30 carbon atoms. These siloxy units can be combined in various manners to form cyclic, linear, or branched organopolysiloxane structures. The chemical and physical properties of organopolysiloxane structures can vary, depending on the type and number of siloxy units present in the organopolysiloxane. For example, organopolysiloxanes can be volatile or low viscosity fluids, high viscosity fluids/gums, elastomers or rubbers, and resins. The organopolysiloxanes useful as silicone resins in the emulsions of the present invention may have any combination of $(R_3SiO_{0.5})$, $(R_2SiO)$, $(RSiO_{1.5})$, or $(SiO_2)$ siloxy units, providing the organopolysiloxane has the empirical formula as described above and a viscosity from 1 to 4000 mPa·s at 25° C. The viscosity may for example be from 10 to 1000 mPa·s, such as 50 to 500 mPa·s, at 25° C.

In one embodiment, the organopolysiloxane selected as the silicone resin in the emulsions of the present invention contains primarily D and T units. In this embodiment, the D and T siloxy besides having an R substituent on the silicon atom, may also contain a hydroxy or alkoxy substituent, designated as OZ, where Z is hydrogen or an alkyl group having 1-4 carbon atoms. Although not wishing to be bound by any theory, the present inventors believe the presence of these OZ groups in the organopolysiloxane provides reactive sites on the resin to allow it to subsequently form a solid coating upon removal of water from the emulsion. Typically, the amount of OZ groups on the organopolysiloxane present as SiOZ groups is at least 10 weight % of SiOZ groups, alternatively the weight % of SiOZ groups ranges from 10 to 40% of the organopolysiloxane. The weight percent of SiOZ in the organopolysiloxane may be routinely determined using $^{29}$Si NMR spectroscopy.

Such a silicone resin useful in the leather coating composition of the present invention may for example have the formula:

$$[(R_2\text{SiO}_{(2-a)/2})_c(OZ)_a][(\text{RSiO}_{(3-b)/2})_{(1-c)}(OZ)_b]$$

where
c and 1-c represent mole fractions of the siloxy units,
a is from 0 to 2,
b is from 0 to 2, and
c is from 0 to 0.6,
with the proviso that a+b is from 0.10 to 2.00;

R is a monovalent organic group having 1-30 carbon atoms, and

Z is hydrogen or an alkyl group having 1-4 carbon atoms.

In this formula $[(R_2SiO_{(2-a)/2})_c(OZ)_a]$ represents D siloxy units and $[(RSiO_{(3-b)/2})_{(1-c)}(OZ)_b]$ represents T siloxy units. The mole fractions of the D and T siloxy units present in the silicone resin are indicated by the subscript "c" and "1-c" respectively. The amount of OZ groups on each siloxy unit may vary, as indicated by the subscripts "a" and "b".

Alternatively, the silicone resin useful in the emulsion composition of the present invention may comprise the formula;

$[(CH_3)_2SiO_{2/2}]_d[(CH_3)SiO_{3/2}]_e$

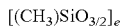
$[(CH_3)SiO_{3/2}]_e$

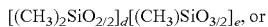
$[(CH_3)_2SiO_{2/2}]_d[(CH_3)SiO_{3/2}]_e$, or

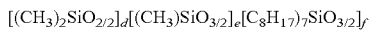
$[(CH_3)_2SiO_{2/2}]_d[(CH_3)SiO_{3/2}]_e[C_8H_{17})_7SiO_{3/2}]_f$

Where subscripts d, e, and f are each an integer greater than zero having a value sufficient to provide the silicone resin with a viscosity as defined above;

alternatively d may vary from 0.4 to 1, or alternatively from 0.1 to 0.3, alternatively e may vary from 0.4 to 1, preferably from 0.7 to 0.9, alternatively f may vary from 0 to 0.1, or alternatively from 0.01 to 0.04.

The silicone resins may be prepared by any known method, but are typically prepared by the ring-opening reaction of a cyclic siloxane followed by hydrolytic polycondensation with alkoxysilane(s) or by the hydrolytic polycondensation of alkoxysilanes. In both procedures, the ring-opening, hydrolysis and condensation reactions can be either acid or base catalyzed. These reactions are then followed by catalyst neutralization, distillative removal of by-product alcohol, filtration and removal of solvent to provide the desired product.

For example, an alkylfunctional silicone resin can be manufactured by preparing a mixture of 50-90 wt % of alkyltrialkoxysilane, dialkyldialkoxysilane and/or cyclic siloxanes, dissolving the mixture in up to 50 wt % of a polar solvent. Typically, the polar solvent can be, but is not limited to, methanol, ethanol, propanol, isopropanol and/or butanol. This mixture is then reacted with deionized water (1-20 wt %) using a suitable acid catalyst. Examples include, but are not limited to, 0.05 wt % trifluoromethanesulfonic acid (TFMSA) or hydrochloric acid. The reaction is then followed by catalyst neutralization, distillative removal of the by-product alcohol. The mixture is then filtered and heated to remove solvent to yield the desired alkylfunctional resin. Typically the alkyl group is comprised of C1-C4, the typical alkoxy group is hydroxyl, methoxy, ethoxy and/or isopropoxy.

Alternatively, silicone resins can be manufactured by preparing a mixture of 50-90 wt % of alkyltrialkoxysilane, dialkyldialkoxysilane and/or cyclic siloxanes, dissolving the mixture in up to 50 wt % of a polar solvent. Typically, the polar solvent can be, but is not limited to, methanol, ethanol, propanol, isopropanol and/or butanol. This mixture is then hydrolyzed with 1-20 wt % deionized water using a catalytic amount of aqueous potassium hydroxide (or another suitable base catalyst known to those skilled in the art. Examples include, but are not limited to, sodium methylate and potassium silanolate. The reaction is then followed by catalyst(s) neutralization, distillative removal of the by-product alcohol. The catalyst can be neutralized with aqueous HCl (or another suitable acid such as acetic acid). The mixture is then filtered and solvent removed to yield the desired alkylfunctional silicone resin. Typically the alkyl group is comprised of C1-C4, the alkoxy group is hydroxyl, methoxy, ethoxy and/or isopropoxy.

The leather coating compositions of the invention generally comprise an organic synthetic resin in aqueous dispersion. By an organic synthetic resin we mean a polymer based on carbon chemistry, that is a polymer in which at least half the atoms in the polymer backbone are carbon atoms. The organic synthetic resin can for example be a polyurethane and/or a polyurea and acts as the main film-forming binder for the coating composition. The organic synthetic resin can be in aqueous solution or in aqueous emulsion or suspension.

The organic synthetic resin can be a non-reactive thermoplastic resin but is more usually a curable resin. For example the leather coating composition may contain a curing agent which reacts with the organic synthetic resin to harden the resin. The curing agent can advantageously be reactive with the resin at ambient temperature. Alternatively the organic synthetic resin can be reactive with the curing agent at elevated temperature or may be self-curing at elevated temperature. The organic synthetic resin can for example be a polyurethane and/or a polyurea containing blocked isocyanate groups which will react with a curing agent having activated hydroxyl groups. A polyurethane may contain free hydroxyl groups which will react with an amino resin curing agent such as a melamine-formaldehyde resin. A polyurea may contain free amine groups which will react with an epoxy resin curing agent. Alternatively a polyurethane containing free hydroxyl groups or a polyurea containing free amine groups can be reacted with a blocked polyisocyanate curing agent.

The organic synthetic resin, together with any curing agent therefor, can for example be present in the aqueous coating composition at at least 10 or 20% by weight up to 65 or 70% by weight, typically at 35 to 60%.

The silicone resin is added to the aqueous dispersion of the organic synthetic resin as an emulsion. The emulsion of silicone resin generally comprises (A) 1-70 weight percent of a silicone resin as defined above, optionally (B) 0-40 weight percent of a hydroxy terminated polydiorganosiloxane, (C) 0.5-20% based on the weight components A) and B) of an emulsifier, and (D) 0.001-5% based on the weight of the emulsion of a water soluble salt.

The emulsifier of the silicone resin emulsion can be of any type, i.e., anionic, cationic, nonionic or amphoteric. For example, the components (A), and (B) if used, can be emulsified by using a nonionic surfactant or a combination of nonionic surfactants having a combined HLB in the range of 10-20. Polyvinyl alcohol (PVA) is an emulsifier which aids in achieving a film forming coating. The PVA can for example have a degree of polymerization ($P_w$) of 600 to 4000, or a weight average molecular weight $M_w$ of 25,000 to 200,000, with a degree of hydrolysis (from the acetate) of 70 to 98 mol %, preferably 80 to 95 mol %. The use level of the PVA can for example be from 2 to 10% based on the total weight of components (A) and (B).

The water soluble organic or inorganic salt (D) preferably renders the aqueous phase of the present invention neutral to slightly alkaline. Examples of water soluble salts that can be used include alkali metal, alkaline earth metal and ammonium salts of carboxylic acids and phosphoric acid. Amines are also effective; examples include alkylamine, diethylamine, triethylamine, ethylene diamine, monoethanolamine, diethanolamine, and triethanolamine. Sodium carbonate or sodium bicarbonate at an active use level of 0.01 to 0.2% based on the weight of the emulsion are particularly effective.

The optionally present polydiorganopolysiloxane (B) may for example have the general formula $[R_2Si(OH)O_{1/2}][R_2SiO_{2/2}]_z[SiR_2(OH)O_{1/2}]$, where R is an organic group containing 1 to 30 carbons and z represents the degree of polymerization and is greater than one. Typically, the hydroxy terminated polydiorganopolysiloxane is a hydroxy terminated polydimethylsiloxane having a degree of polymerization (z) from 2 to 1000, for example from 5 to 200, such as from 10 to 100.

The silicone resin emulsion can for example be added to the leather coating composition in an amount sufficient to provide 0.5 to 30% by weight silicone resin (including any hydroxy terminated polydimethylsiloxane present with the silicone resin) based on the organic synthetic resin (including any curing agent therefor), such as 1 or 2% up to 10 or 15% silicone resin based on the organic synthetic resin. The silicone resin is generally present in the leather coating composition at 0.1 to 20% by weight, for example 0.5 to 5%.

The leather coating composition can contain other ingredients known for use in such compositions, for example one or more pigments or fillers, an antisqueak agent, a rheology additive to increase or reduce the flow of the composition, a foam control agent, an anti-freeze agent and/or a biocide.

The leather coating composition of the invention can be applied to various types of leather, for example conventional leather, nubuck or suede. The coating can be applied to finished leather or at the final wet stage in finishing leather. The coating composition is applied to the surface of the leather and is allowed to dry on the surface. The coating is for example applied at a wet film thickness of 10-100 μm, corresponding to a dry film thickness of about 2 to 70 μm. Drying can be at ambient temperature or at elevated temperature depending on the curing properties of the resin binder in the composition.

Leather coated according to the invention with a coating containing silicone resin has greatly increased abrasion resistance. Abrasion resistance can for example be measured using a Taber abrasion wheel to abrade the coated leather surface. This increase in abrasion resistance is achieved without detriment to the compatibility and the flexibility of the final coating; other additives to increase abrasion resistance may harshen the touch of the coated leather and increase resistance to bending, causing cracks in the structure of the coating. Leather coated according to the invention also has increased water repellency.

The following Example is intended to illustrate the invention to one of ordinary skill in the art and should not be interpreted as limiting the scope of the invention set forth in the claims. Parts and percentages are by weight.

EXAMPLE 1

A 6,000 g batch of silicone resin was prepared by mixing 8,262.4 g of methyltrimethoxysilane, 812.8 g of octamethylcyclotetrasiloxane, 404.1 g of n-octyltriethoxysilane, and 333.3 g methanol. The mixture was hydrolyzed using 4.3 g trifluoromethanesulfonic acid (TFMSA) and 1,349.8 g deionized water, while heating the mixture to reflux temperature (68-70° C.) for 10 hours. The catalyst was then neutralized using 16.5 g $CaCO_3$. The alcohol by-product(s) and residual solvent were removed by distillation, and the resulting composition filtered. The final alkylfunctional silicone resin composition was analyzed and contained; 16.0 mol % $Me_2SiO_{2/2}$, 84.0 mol % $RSiO_{3/2}$, 17.9 wt % SiOZ confirming a silicone where 1.7 mol % of the R groups are octyl radical and the rest are methyl, Z is hydrogen or methyl, with at least 80 mol % being methyl.

An emulsion was made by mixing 50 parts of the above silicone resin with 30 parts of a 10% aqueous solution of a polyvinylalcohol of 92% degree of hydrolysis and a molecular weight of 175,000 and 20 parts of water till homogeneous. The mixture was then passed through a 2-inch pipeline Greerco™ mixer (Chemineer Corp) at 4500 rpm with a back pressure of 20 psi and a pump speed of 40 Hz once. The resultant emulsion was homogeneous and milky white. 0.1% sodium bicarbonate was added based on the weight of the emulsion.

30 parts of the above silicone resin emulsion was mixed into the binder portion of a 2-part polyurethane leather coating composition comprising 450 parts polyurethane resin binder dispersed in 350 parts water with 10 parts pigment, 180 parts antisqueak and 10 parts flow promoter. 70 parts resin hardener dispersed in 70 parts water was then mixed in for 10 minutes to form the full coating composition.

The coating composition was applied to vegetable tanned leather using a Meyer's bar calibrated at 34 microns and was allowed to dry at room temperature. The leather is conditioned for 24 hours at room temperature and 65% relative humidity.

In an abrasion test, the coated leather was abraded on a Taber test apparatus. The abrasion is conducted using H18 wheel and 250 g additional weight on each of the Taber arms (for 500 cycles). On visual inspection after the test, the coating had suffered only slight degradation and the general appearance of the coated leather was as before the test. On a scale of abrasion resistance from 1 (poor) to 5 (excellent), the coated leather of the invention was graded 4.

In a comparative test, vegetable tanned leather was coated with the same 2-part polyurethane leather coating composition with the omission of the silicone resin emulsion and conditioned at the same temperature and humidity. When this coated leather was subjected to the same Taber abrasion test, the coating was destroyed in the abraded area and the underlying leather structure was visible. The grade of this comparative example was 1, showing that the silicone resin had greatly improved the abrasion resistance of the coated leather.

The invention claimed is:

1. A leather coating composition comprising an organic synthetic resin having a polymer backbone in which at least half of the atoms in its polymer backbone are carbon atoms in aqueous dispersion and an organopolysiloxane, wherein the organopolysiloxane is present in aqueous emulsion and comprises a silicone resin having a viscosity of from 1 to 4000 mPa·s at 25° C. and an empirical formula $$R_xSi(OZ)_y(O)_{\frac{4-x-y}{2}}$$

where

R is a monovalent organic group having 1-30 carbon atoms,

Z is hydrogen or an alkyl group having 1-4 carbon atoms, x has a value from 0.75 to 1.7, and y has a value from 0.1 to 2.0.

2. A leather coating composition according to claim 1, wherein the silicone resin has the formula:

$$[(R_2SiO_{(2-a)/2})_c(OZ)_a][(RSiO_{(3-b)/2})_{(1-c)}(OZ)_b]$$

where c and 1-c represent mole fractions of the siloxy units, c is from 0 to 0.6, a is from 0 to 2, b is from 0 to 2, with the proviso that a+b is from 0.10 to 2.00;
R is a monovalent organic group having 1-30 carbon atoms, and
Z is hydrogen or an alkyl group having 1-4 carbon atoms.

3. A leather coating composition according to claim 2, wherein at least 80% of R is methyl, and Z is hydrogen or alkyl with 1-4 carbon.

4. A leather coating composition according to claim 2, wherein the silicone resin is present at 0.5 to 30% by weight based on the organic synthetic resin.

5. A leather coating composition according to claim 2, wherein the organic synthetic resin comprises a polyurethane and/or a polyurea.

6. A leather coating composition according to claim 2, wherein the composition also contains a hydroxy terminated polydiorganosiloxane.

7. A process for coating leather, wherein a coating composition prepared according to claim 6 is applied to the surface of the leather and is allowed to dry on the surface.

8. A process for coating leather, wherein a coating composition according to claim 2 is applied to the surface of the leather and is allowed to dry on the surface.

9. A leather coating composition according to claim 1, wherein at least 80% of R is methyl, and Z is hydrogen or alkyl with 1-4 carbon.

10. A leather coating composition according to claim 1, wherein the silicone resin is present at 0.5 to 30% by weight based on the organic synthetic resin.

11. A leather coating composition according to claim 1, wherein the organic synthetic resin comprises a polyurethane and/or a polyurea.

12. A leather coating composition according to claim 1, wherein the composition also contains a hydroxy terminated polydiorganosiloxane.

13. A process for coating leather, wherein a coating composition according to claim 1 is applied to the surface of the leather and is allowed to dry on the surface.

14. A process for the preparation of a leather coating composition wherein an emulsion of a silicone resin is added to an aqueous dispersion of an organic synthetic resin having a polymer backbone in which at least half of the atoms in its polymer backbone are carbon atoms, the said emulsion comprising
A) 1-70 weight percent of a silicone resin having a viscosity of from 1 to 4000 mPa·s at 25° C. and an empirical formula:

$$R_x\mathrm{Si}(OZ)_y(O)_{\frac{4-x-y}{2}}$$

where
R is a monovalent organic group having 1-30 carbon atoms,
Z is hydrogen or an alkyl group having 1-4 carbon atoms,
x has a value from 0.75 to 1.7, and
y has a value from 0.1 to 2.0;
B) 0-40 weight percent of a hydroxy terminated polydiorganosiloxane;
C) 0.5-20% based on the weight A) and B) of an emulsifier, and
D) 0.001-5% based on the weight of the emulsion of a water soluble salt.

15. A process according to claim 14 wherein the emulsifier is polyvinyl alcohol.

16. A process according to claim 14 wherein the water soluble salt is sodium hydrogen carbonate or sodium carbonate.

17. A leather coating composition prepared by the process of claim 14.

18. A process for coating leather, wherein a coating composition according to claim 14 is applied to the surface of the leather and is allowed to dry on the surface.

* * * * *